US012774011B2

(12) United States Patent
Nojoumian

(10) Patent No.: US 12,774,011 B2
(45) Date of Patent: Oct. 27, 2026

(54) ADAPTIVE SPEED-LIMIT MEASUREMENT (ASM) BASED ON THE TRAFFIC FLOW IN SEMI OR FULLY AUTONOMOUS VEHICLES

(71) Applicant: FLORIDA ATLANTIC UNIVERSITY BOARD OF TRUSTEES, Boca Raton, FL (US)

(72) Inventor: Mehrdad Nojoumian, Boca Raton, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 0 days.

(21) Appl. No.: 19/173,196

(22) Filed: Apr. 8, 2025

(65) Prior Publication Data

US 2025/0313231 A1 Oct. 9, 2025

Related U.S. Application Data

(60) Provisional application No. 63/631,090, filed on Apr. 8, 2024.

(51) Int. Cl.

*B60W 60/00* (2020.01)
*B60W 50/14* (2020.01)
*G01C 21/00* (2006.01)

(52) U.S. Cl.

CPC ........... *B60W 60/001* (2020.02); *B60W 50/14* (2013.01); *B60W 2552/00* (2020.02); *B60W 2554/4042* (2020.02); *B60W 2554/4044* (2020.02); *B60W 2554/4046* (2020.02); *B60W 2555/20* (2020.02); *B60W 2556/10* (2020.02); *B60W 2556/40* (2020.02); *B60W 2556/45* (2020.02); *G01C 21/3859* (2020.08)

(58) Field of Classification Search

None
See application file for complete search history.

(56) References Cited

U.S. PATENT DOCUMENTS 8,359,149 B2 1/2013 Shin
11,823,568 B2 * 11/2023 Lerner ................. G05D 1/0285
2006/0095195 A1 5/2006 Nishimura et al.
2012/0059574 A1 * 3/2012 Hada .................... G08G 1/0112 701/119
2020/0050209 A1 * 2/2020 Bai .................... B60K 31/0058
(Continued)

FOREIGN PATENT DOCUMENTS

EP 0716949 B1 3/1999
KR 20210071796 A 6/2021

*Primary Examiner* — Jennifer M Anda
(74) *Attorney, Agent, or Firm* — Meunier Carlin & Curfman LLC

(57) ABSTRACT

Systems, methods, and devices described herein can be used to dynamically determine and modify driving parameters for a vehicle, such as an autonomous or semi-autonomous vehicle. An example vehicle system can be configured to: monitor a vehicle's geographic location; obtain data corresponding with the vehicle's geographic location; determine one or more traffic flow characteristics; determine one or more traffic flow characteristics based at least on the data; and determine one or more target driving parameters (e.g., a safe speed limit) for the at least one vehicle based at least on the one or more traffic flow characteristics.

18 Claims, 3 Drawing Sheets

(56) References Cited

U.S. PATENT DOCUMENTS

| | | | | |
|---|---|---|---|---|
| 2020/0116497 | A1* | 4/2020 | Jiang | G01C 21/3896 |
| 2020/0180610 | A1* | 6/2020 | Schneider | B60W 40/04 |
| 2020/0238988 | A1 | 7/2020 | Fukaya et al. | |
| 2021/0125076 | A1* | 4/2021 | Zhang | G06N 3/045 |
| 2022/0126883 | A1* | 4/2022 | Ucar | H04W 76/15 |
| 2024/0011785 | A1* | 1/2024 | Qiao | G01C 21/3407 |
| 2025/0360923 | A1* | 11/2025 | Schuerman | B60W 30/143 |

* cited by examiner

ADAPTIVE SPEED-LIMIT MEASUREMENT (ASM) BASED ON THE TRAFFIC FLOW IN SEMI OR FULLY AUTONOMOUS VEHICLES

CROSS-REFERENCE TO RELATED APPLICATIONS

This application claims priority to and the benefit of U.S. Provisional Application No. 63/631,090, titled "ADAPTIVE SPEED-LIMIT MEASUREMENT (ASM) BASED ON THE TRAFFIC FLOW IN SEMI OR FULLY AUTONOMOUS VEHICLES", filed on Apr. 8, 2024, the content of which is incorporated by reference herein in its entirety.

BACKGROUND

One of the major challenges that semi or fully Autonomous Vehicles (AV) face is their reliance on posted speed-limits on roads and highways. They read this data from the map or traffic signs, and accordingly, navigate the vehicle with the same exact speed-limit, slightly higher, or lower than the posted speed-limit, but not the speed of the traffic flow, i.e., a set of vehicles in a larger division of the road that move in the same direction. This potentially can be the root cause of catastrophic accidents by semi or fully autonomous vehicles.

As such, there is a need for improved safety and reliability of such systems. These needs and others are at least partially satisfied by the present disclosure.

SUMMARY

Disclosed herein are systems, methods, and devices that can be used to augment and address various deficiencies in adaptive driving (e.g., adaptive speed-limit measurement) in vehicle systems, including autonomous and semi-autonomous vehicle systems.

In some implementations, an Adaptive Speed-limit Measurement (ASM) system based on Traffic Flow in Semi or Fully Autonomous Vehicles is provided. The example system consists of (1) The AV's existing devices (e.g., radar, lidar, sonar, cameras, etc) and cloud and/or AV computing infrastructure to collect data and analyze it; (2) Cloud and/or local storage to store real-time data, of all kinds from all sources, regarding speeds and braking frequencies of the surrounding vehicles in a specific division of the road periodically; and (3) Algorithms to adaptively measure a safe speed-limit in real-time based on the collected data, and to inform the semi or fully autonomous vehicle regarding the safe speed-limit in that specific time and division of the road based on the traffic flow through existing communication platforms. The system can also provide a warning to the operator to take over immediately in the case of a high fluctuation of the calculated speed-limit or a high-frequency of brakings above a certain threshold. The system can predict safe speed-limits adaptively in terms of time and location based on static (e.g., road condition) as well as active (e.g., traffic flow) factors using machine learning and artificial intelligence. Furthermore, the system can share this information with other vehicles in a connected or cooperative driving context. Embodiments of the present disclosure can be embodied in the form of a dynamic driving sign (e.g., digital panel), to be installed on the side of roads and highways, to show or broadcast the real-time speed-limit adaptively (based on the traffic flow in a division of the road) in addition to the posted speed-limit to human drivers as well as semi or fully autonomous vehicles.

In some implementations, a driving system is provided. The driving system can include: at least one vehicle, the at least one vehicle including: at least one processor (e.g., cloud-based processing system) in electronic communication with the at least one vehicle; and a memory having instructions thereon, wherein the instructions when executed by the at least one processor, cause the at least one processor to: obtain data corresponding with the at least one vehicle's geographic location, wherein the data as associated with at least another vehicle in the geographic location (e.g., a plurality of vehicles within the geographic location or a subset thereof); determine one or more traffic flow characteristics based at least on the data; and determine one or more target driving parameters (e.g., a safe speed limit) for the at least one vehicle based at least on the one or more traffic flow characteristics.

In some implementations, the instructions when executed by the at least one processor cause the at least one processor to further: modify one or more current driving parameters (e.g., driving speed) of the at least one vehicle based at least on the determined one or more target driving parameters (e.g., safe speed limit).

In some implementations, the instructions when executed by the at least one processor cause the at least one processor to further: filter at least a portion of the obtained data.

In some implementations, filtering at least a portion of the obtained data comprises: identifying aggressive drivers (e.g., using a machine learning model); and excluding data associated with the identified aggressive drivers.

In some implementations, the one or more traffic flow characteristics include at least one of speed limit fluctuations or an above-threshold frequency of braking events associated with the at least another vehicle in the geographic location.

In some implementations, the instructions when executed by the at least one processor cause the at least one processor to further: modify the at least one vehicle's route, generate an alert or recommendation, and/or modify a vehicle driving mode (e.g., deactivate an autonomous driving mode) based at least on the one or more target driving parameters.

In some implementations, the one or more traffic flow characteristics are determined using a machine learning model.

In some implementations, the machine learning model is a neural network model.

In some implementations, the instructions when executed by the at least one processor cause the at least one processor to further: dynamically output an indication of at least one of the determined target driving parameters (e.g., safe speed limit) to a dynamic driving sign.

In some implementations, the instructions when executed by the at least one processor cause the at least one processor to further: transmit an indication of at least one of the determined target driving parameters (e.g., safe speed limit) to another apparatus (e.g., another vehicle) that is within a predetermined range of the at least one vehicle or to a central server.

In some implementations, the obtained data includes real-time vehicle data obtained from the at least another vehicle.

In some implementations, the real-time vehicle data includes at least one of a vehicle speed, temperature, direction of travel, and vehicle path deviation/variance (e.g., swerving).

In some implementations, the data includes current weather conditions, time of year, historical accident data corresponding with the vehicle's geographic location, real-time or historical vehicle data (e.g., from the vehicle or one or more other vehicles), and/or road infrastructure data.

In some implementations, the data is at least partially obtained from one or more databases (e.g., public databases).

In some implementations, the one or more traffic flow characteristics or one or more driving parameters is used to update one or more existing maps and/or navigation systems.

In some implementations, the at least one vehicle is an autonomous or semi-autonomous vehicle.

In some implementations, a cooperative driving system is provided. The cooperative driving system can include: a plurality of vehicles in electronic communication with one another, each vehicle including: a processor; and a memory having instructions thereon, wherein the instructions when executed by the at least one processor, cause the processor to: obtain data corresponding with the respective vehicle's geographic location; determine one or more traffic flow characteristics based at least on the data; and determine one or more target driving parameters (e.g., a safe speed limit) for the respective vehicle based at least on the one or more traffic flow characteristics, wherein each of the plurality of vehicles is configured to transmit an indication of at least one of the target driving parameters to at least another vehicle or a central server.

In some implementations, each of the plurality of vehicles is configured to transmit the indication of at least one of the target driving parameters to the at least another vehicle when it is within a predetermined range.

In some implementations, each vehicle is an autonomous or semi-autonomous vehicle.

In some implementations, a method is provided. The method can include: monitoring at least one vehicle's geographic location; obtaining data corresponding with the at least one vehicle's geographic location, wherein the data as associated with at least another vehicle in the geographic location; determining one or more traffic flow characteristics based at least on the data; and determining one or more target driving parameters (e.g., a safe speed limit) for the at least one vehicle based at least on the one or more traffic flow characteristics.

In some implementations, a dynamic driving sign is provided. The dynamic driving sign can include: at least one processor in electronic communication with at least one vehicle and/or a remote server; and a memory having instructions thereon, wherein the instructions when executed by the at least one processor, cause the at least one processor to: continuously determine or obtain one or more target driving parameters (e.g., a safe speed limit); and dynamically display at least one of the target driving parameters via a display, wherein the one or more target driving parameters are determined based at least on one or more traffic flow characteristics determined from data corresponding with the at least one vehicle's geographic location, and wherein the data as associated with at least another vehicle in the geographic location.

In some implementations, a non-transitory computer readable medium is provided. The non-transitory computer readable medium can include a memory having instructions stored thereon to perform any of the systems or methods described herein.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF DRAWINGS

The components in the drawings are not necessarily to scale relative to each other. Like reference, numerals designate corresponding parts throughout the several views.

DETAILED DESCRIPTION

Figure 1:
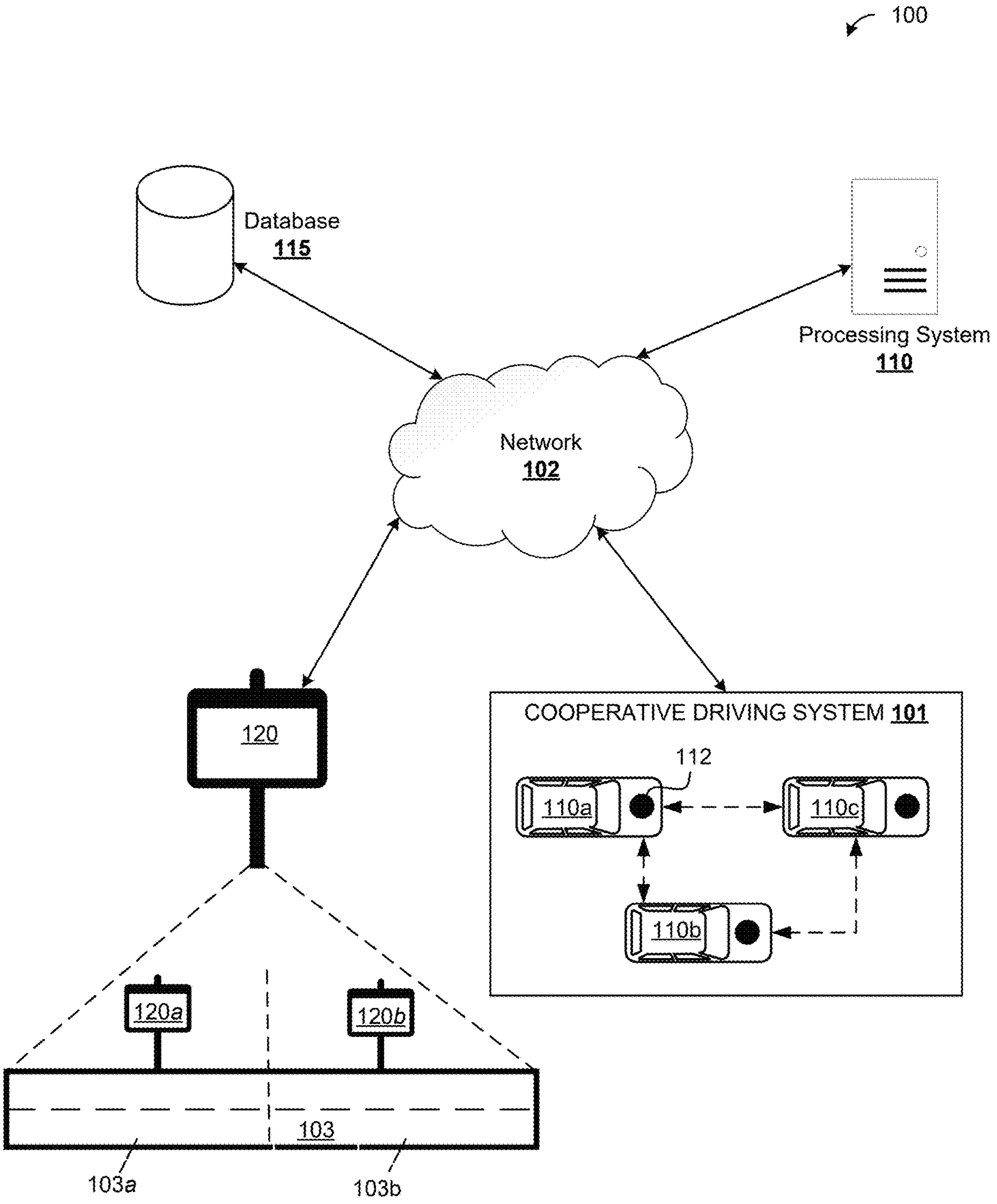
FIG. 1 is an example system in accordance with certain embodiments of the present disclosure.

It is appreciated that certain features of the disclosure, which are, for clarity, described in the context of separate embodiments, can also be provided in combination with a single embodiment. Conversely, various features of the disclosure, which are, for brevity, described in the context of a single embodiment, can also be provided separately or in any suitable sub-combination. Unless defined otherwise, all technical and scientific terms used herein have the same meaning as commonly understood by one of ordinary skill in the art. Methods and materials similar or equivalent to those described herein can be used in the practice or testing of the present disclosure.

DEFINITIONS

In this specification and in the claims that follow, reference will be made to a number of terms, which shall be defined to have the following meanings:

Throughout the description and claims of this specification, the word "comprise" and other forms of the word, such as "comprising" and "comprises," means including but not limited to, and are not intended to exclude, for example, other additives, segments, integers, or steps. Furthermore, it is to be understood that the terms comprise, comprising, and comprises as they relate to various embodiments, elements, and features of the disclosure also include the more limited embodiments of "consisting essentially of" and "consisting of."

As used herein, the singular forms "a," "an," and "the" include plural referents unless the context clearly dictates otherwise. Thus, for example, reference to a "sensing device" includes embodiments having two or more such sensing devices unless the context clearly indicates otherwise.

Ranges can be expressed herein as from "about" one particular value and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

For the terms "for example" and "such as," and grammatical equivalences thereof, the phrase "and without limitation" is understood to follow unless explicitly stated otherwise.

As used herein, the terms "data," "content," "information," and similar terms may be used interchangeably to refer to data capable of being transmitted, received and/or stored in accordance with embodiments of the present invention.

As noted above, one of the major challenges that semi or fully AVs face is their reliance on posted speed-limits on roads and highways. They read this data from the map or traffic signs, and accordingly, navigate the vehicle with the same exact speed-limit, slightly higher, or lower than the posted speed-limit based on the speed of the front or adjacent vehicles, but not the speed of the traffic flow, i.e., a set of vehicles in a larger division of the road that move in the same direction. In reality, the average speed of the traffic flow defines a safe speed-limit for a specific division of the road that might be different from the posted speed-limit. This potentially can be the root cause of catastrophic accidents by semi or fully autonomous vehicles. Although technologies such as the Adaptive or Traffic-aware Cruise Control and the Emergency Braking System, which mainly rely on the speed of the front vehicle, may prevent accidents in certain scenarios, they don't operate based on the average speed of the traffic flow that considers a larger set of vehicles. In addition, navigating semi or fully autonomous vehicles based on the average speed of the traffic flow can prevent unnecessary brakings that leads to safer driving for all vehicles as well as less energy consumption by vehicles.

There is a high and growing demand for technology that informs semi or fully autonomous vehicles (A Vs) about the safe speed limit in the context of current traffic flow. Current technologies like adaptive cruise control primarily focus on the speed of the immediately preceding vehicle, not the overall traffic flow. This has limitations, particularly in scenarios requiring wider situational awareness. By way of example, existing adaptive and traffic-aware cruise control (ACC/TACC) systems operate based on the vehicle in front, i.e., the lead vehicle. In such examples, if the lead vehicle is driven by an aberrant driver, for example, an aggressive driver or DUI (driving under influence) driver, this can result in misleading information being sent/provided to the ACC/TACC. A technology that accounts for the overall traffic flow offers several benefits:

Improved safety: By considering the broader flow of traffic, autonomous vehicles can adjust their speed more smoothly and predictably, potentially reducing the risk of accidents.

Enhanced efficiency: Maintaining a consistent speed within the flow of traffic can optimize traffic flow and reduce congestion, leading to shorter travel times and potentially lower fuel consumption.

Reduced driver workload: For semi-autonomous vehicles, this technology can alleviate the mental strain of constantly monitoring traffic and adjusting speed, allowing drivers to focus on other aspects of the road.

Within the specific context of autonomous vehicles, the subject technology would offer several commercial advantages:

Enhanced Safety: By adjusting speed smoothly and predictably based on the surrounding traffic flow, autonomous vehicles can significantly reduce the risk of accidents, particularly rear-end collisions and sudden stops. This translates to fewer repairs, lower insurance costs, and improved brand reputation for autonomous vehicle manufacturers and operators.

Improved Operational Efficiency: Maintaining a consistent speed within the traffic flow leads to optimized travel times and reduced congestion. This translates to increased utilization of autonomous vehicles, allowing companies to serve more customers or transport more goods in a shorter period, leading to greater profitability.

Reduced Infrastructure Costs: As autonomous vehicles become more ubiquitous and traffic flow improves due to better speed management, the need for costly infrastructure expansions like additional lanes or wider roads could potentially decrease. This translates to significant cost savings for governments and allows them to allocate resources towards other transportation needs.

Increased Public Acceptance: Smoother traffic flow and reduced congestion lead to a positive public perception of autonomous vehicles. This is crucial for the wider adoption and integration of this technology into transportation systems.

Integration with Smart Cities: This technology can seamlessly integrate with the concept of smart cities, where infrastructure and services are interconnected and communicate with each other. Real-time traffic data from autonomous vehicles can be used to optimize traffic light timing, manage parking availability, and improve overall urban mobility, further enhancing the efficiency and sustainability of smart city initiatives.

Beyond its integration into autonomous vehicles, this technology also holds potential for various commercial applications:

Advanced Driver-Assistance Systems (ADAS): Existing ADAS features like adaptive cruise control could be enhanced by incorporating real-time traffic flow data. This could provide a smoother and more efficient driving experience for human drivers, potentially reducing driver fatigue and improving fuel efficiency.

Traffic Management Systems: Traffic authorities could leverage this technology to dynamically adjust speed limits on highways and major roads based on real-time traffic conditions. This could help alleviate congestion, improve traffic flow, and potentially reduce accidents.

Fleet Management: Companies operating vehicle fleets could utilize this technology to optimize routing and speed for their vehicles, leading to improved efficiency, reduced fuel costs, and potentially lower emissions.

Urban Planning and Development: City planners could incorporate this technology into traffic simulations and modeling tools to design and evaluate infrastructure projects that optimize traffic flow and improve overall transportation efficiency.

Insurance Companies: Usage-based insurance (UBI) programs could potentially use this data to assess individual driver risk profiles more accurately, potentially leading to fairer and more personalized insurance rates.

In various implementations, the proposed technology considers the overall traffic flow, providing a broader picture of the surrounding environment. This allows for smoother and more proactive adjustments to maintain a safe and efficient driving rhythm. By considering the wider traffic flow, this technology can potentially avoid situations where ACC/TACC might lead to sudden braking due to unexpected slowdowns or merging vehicles. This proactive approach can significantly reduce the risk of rear-end collisions and improve overall traffic safety. By enabling autonomous vehicles to maintain consistent speed within the traffic flow, this technology promotes smoother and more predictable vehicle movement. This can significantly reduce congestion, improve travel times, and potentially optimize fuel efficiency compared to ACC/TACC, which may cause unnecessary braking and acceleration. Further, the proposed technology aligns well with the vision of connected and autonomous vehicles (CAVs), where vehicles communicate with each other and infrastructure to optimize traffic flow. It can serve as a crucial building block for future advancements in smart transportation systems. The improved safety and efficiency offered by this technology can lead to long-term cost savings for various stakeholders. Reduced accidents translate to lower insurance costs, while smoother traffic flow can potentially lead to less infrastructure development needs.

Embodiments of the present disclosure provide methods and systems for determining a predictive output/one or more driving parameters for an autonomous or semi-autonomous vehicle that may be part of a cooperative vehicle system. In some examples, the system obtains data from a plurality of sources and analyzes the data to determine a predictive output indicative of one or more target driving parameters including, but not limited to, optimal driving speed in a dynamic/adaptive fashion. The system can trigger an alert or corrective operation, including transmitting indications of one or more target driving parameters outputs to other apparatuses. The proposed systems and methods which, in some examples, inform about the safe speed limit based on traffic flow, offer a more comprehensive and proactive approach towards vehicle navigation, leading to safer, smoother, and more efficient transportation systems.

Example System

FIG. 1 is an example system 100 in accordance with certain embodiments of the present disclosure. As shown in FIG. 1, the system 100 includes a processing system 110 or device (e.g., cloud-based processing system) configured to communicate with a cooperative driving system 101. In various implementations, the processing system 110 and the cooperative driving system 101 are configured to transmit data to and receive data from one another over a network 102. The system 100 can include one or more databases, data stores, repositories, and the like. As shown, the system 100 includes database(s) 115 in communication with the cooperative driving system 101 and the processing system 110. In some implementations, the database(s) 115 can be hosted by the processing system 110.

In some implementations, as illustrated, the cooperative driving system 101 comprises a plurality of cooperative vehicles 110*a*, 110*b*, 110*c* (e.g., autonomous vehicles, semi-autonomous vehicles, or combinations thereof) in electronic communication with one another. For example, the cooperative driving system 101 can comprise a plurality of autonomous vehicles each using machine vision operations/techniques to navigate its environment. The present disclosure contemplates that the cooperative driving system 101 is not limited to the example depicted in FIG. 1 and can comprise surgical robots, care-giving robots, drone systems, and/or the like in electronic communication with one another.

As further described herein, each of the plurality of cooperative vehicles 110*a*, 110*b*, 110*c* can include one or more sensing devices configured to monitor and/or obtain real-time information/data from the environment (e.g., image data, video data, audio data, vehicle data, body data from one or more individuals, environmental data (e.g., temperature, pressure) and the like). For example, as shown, the first cooperative vehicle 110*a* comprises at least one sensing device 112. The sensing device(s) 112 can be or comprise one or more optical devices, advanced cameras and/or sensors that may utilize high dynamic range (HDR) imaging and adaptive exposure control. The example sensing device(s) 112 can also include infrared cameras, light detection and ranging (LiDAR) sensor(s), short range radio detection and ranging (RADAR) sensor(s), or combinations thereof.

By way of example, each of the plurality of cooperative vehicles 110*a*, 110*b*, 110*c* can be configured to obtain data from its environment that can in turn be used to determine a predictive output such as target driving parameters for operating the vehicle. Further, each of the plurality of cooperative vehicles 110*a*, 110*b*, 110*c* can generate and transmit indications of the determined predictive outputs/target driving parameters to one or more other vehicles within a predetermined range. These indications can be used to trigger corrective operations in relation to the other vehicles. In some implementations, a given vehicle can transmit such information to a server (e.g., processing system 110) where it may be stored in a database 115 for subsequent analysis, to update one or more maps, and/or used to generate and send indications or instructions to vehicles in communication therewith or in response to requests for such information.

As further depicted in FIG. 1, the system 100 includes one or more dynamic driving signs 120 in electronic communication with the cooperative driving system 101, the processing system 110, and/or the database(s) 115. The one or more dynamic driving signs 120 can include or comprise any components of the system 300 described in connection with FIG. 3. The one or more dynamic driving signs 120 (e.g., digital panels) are configured to dynamically display one or more target driving parameters via a display that are determined using the system 100, as described in more detail below. For example, as illustrated in FIG. 1, a road 103 can comprise multiple dynamic driving signs 120*a*, 120*b* that are each associated with a segment of the road 103 (e.g., a first dynamic driving sign 120*a* associated with a first segment of the road 103*a*, and a second dynamic driving sign 120*b* associated with a second segment of the road 103*b* and in electronic communication with the first dynamic driving sign 120*a*. An example dynamic driving sign 120 can be embodied as or comprise a computing device, such as, but not limited to, the computing device 400 described in connection with FIG. 4. An example dynamic driving sign 120 can be installed on the side of roads and highways, to show or broadcast the real-time speed-limit adaptively (based on the traffic flow in a division of the road) in addition to the posted speed-limit to human drivers as well as semi or fully autonomous vehicles. It should be understood that embodiments of the present disclosure are not limited to semi or fully autonomous vehicles and can include human-controlled vehicles, vehicle cruise control systems, ACC/TACC systems, and/or the like.

Figure 2:
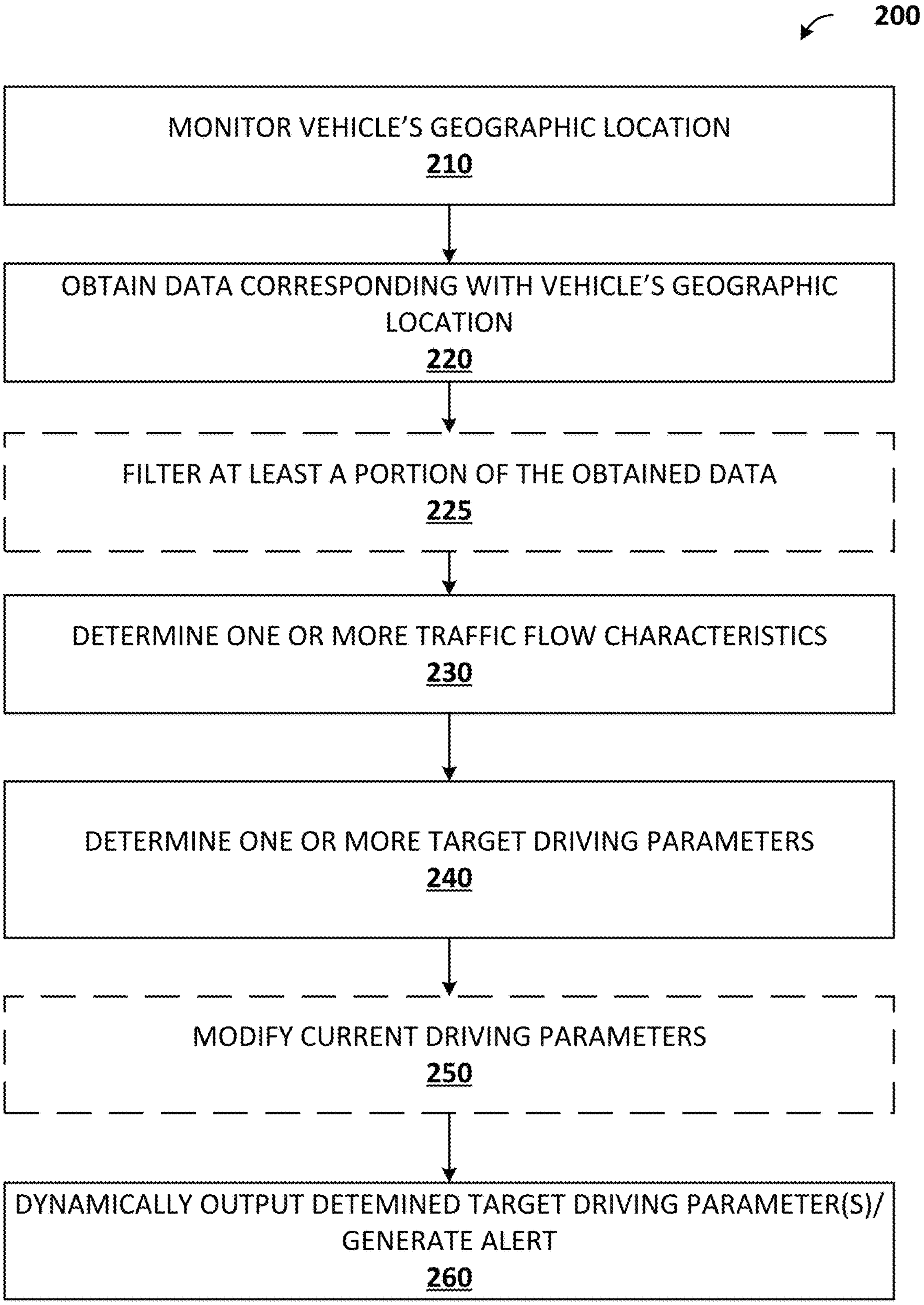
FIG. 2 is flowchart diagram illustrating a method in accordance with certain embodiments of the present disclosure.

Referring now to FIG. 2, a flowchart diagram depicting a method 200 for determining one or more target driving parameters for operating a vehicle (e.g., an autonomous or semi-autonomous vehicle) is provided. The method 200 can include triggering corrective operations, and/or generating alerts. This disclosure contemplates that the example method 200 can be performed using one or more computing devices (e.g., at least the configuration illustrated in FIG. 4 by box 402) and/or at least partially by a cooperative driving system 101 and/or dynamic sign(s) 120 described in connection with FIG. 1. It should be understood that the method 200 can be performed continuously in real-time to facilitate dynamic adjustment of a vehicle's driving parameters.

At step/operation 210, the method 200 includes monitoring data (e.g., the vehicle's environment), such as, but not limited to, image data/video data via at least one sensing device above. As described above, the at least one sensing device may be operatively coupled to or a component of a cooperative driving system such as an autonomous vehicle or semi-autonomous vehicle. The at least one sensing device can be or comprise one or more optical devices, image sensors, location sensors (such as a global positioning system (GPS) sensor), camera(s), two dimensional (2D) and/or three dimensional (3D) light detection and ranging (LiDAR) sensor(s), long, medium, and/or short range radio detection and ranging (RADAR) sensor(s), ultrasonic sensors, electromagnetic sensors, (near-) infrared (IR) cameras, 3D cameras, 360° cameras, accelerometer(s), gyroscope(s), and/or other sensors that enable the vehicle to determine one or more features of the corresponding surroundings, and/or other components configured to perform various operations, procedures, functions or the like described herein. In some implementations, the method 200 includes obtaining real-time or historical vehicle data from the vehicle and/or for one or more other vehicles. The real-time vehicle data can include at least one of a vehicle speed, temperature, direction of travel, and vehicle path deviation/variance (e.g., swerving). For example, real-time vehicle data can comprise a frequency and/or degree of swerving relative to historical driving data for the vehicle (e.g., the vehicle is swerving more than usual based on historical information for the vehicle) and/or similar data for other vehicles in a given location.

At step/operation 220, the method 200 includes obtaining (e.g., requesting, retrieving) data corresponding with the vehicle's geographic location, for example, data associated with one or more other vehicles within the geographic location or a subset thereof. In some implementations, a single vehicle can obtain (e.g., provide) information associated with multiple other vehicles in electronic communication therewith. The vehicle's geographic location can be a one or more private roads and/or public roads. Such data can include historical weather conditions, current weather conditions, time of year data, road infrastructure data, and/or historical accident data associated with one or more vehicles in the vehicle's geographic location. In some implementations, the vehicles on-board sensors (e.g., lidar, radar, sensors, image sensors, and/or the like) can observe other vehicles in the vicinity and can count the number of brake lights (e.g., red lights) from multiple vehicles that are driving ahead. Additionally, and/or alternatively, a vehicle can obtain and/or record road infrastructure data such as a number of cameras, radars, or rubber bands (e.g., rumble strips, alert strips) on the road which can be used to count the number of passing vehicles. Additionally, the method 200 can include obtaining data from one or more databases (e.g., public databases, private databases), such as police reports, road incident data. This information can be obtained from government agencies including the Federal Department of Transportation (FDOT) and National Highway Traffic Safety Administration (NHTSA). For example, the Department of Transportation in each state provides an Annual Average Daily Traffic (AADT) data.

In some implementations, at step/operation 225, the method 200 includes filtering at least some of the obtained data. For example, the vehicle system (e.g., computing device) can be configured to identify and filter out data that would skew the system's output/results. In some examples, step/operation 225 includes identifying aggressive drivers/vehicles (e.g., using a machine learning model) and excluding data associated with the identified aggressive drivers/vehicles. Aggressive drivers/vehicles can be characterized by going over the speed limit, going over the traffic speed, frequently pressing the brakes, failing to sustain a safe distance from other vehicles, tailgating, frequently overtaking other vehicles, and the like. In one implementation, aggressive drivers/vehicles can be identified by evaluating driving information (e.g., speed, swerving) for a plurality of vehicles and determining that the driving information for at least one of the plurality of vehicles deviates significantly from the others. For example, an aggressive driver/vehicle may change lanes more frequently, brake more frequently, and move at a faster speed than other vehicles within a given area/location. In some implementations, historical data/information can be used to determine a typical braking frequency, lane change frequency, or appropriate speed for the area/location. Data obtained from aggressive drivers/vehicles can skew traffic flow data and analysis which would negatively impact the vehicle system's ability to accurately determine an appropriate speed limit or other driving parameters. This data can be detected and filtered by the system so that it doesn't affect the learning process, i.e., the system should not consider aggressive drivers in the traffic flow and/or should exclude them from any adaptive speed-limit measurement as well as any machine learning analysis. In some implementations, such data can be filtered using machine learning techniques.

At step/operation 230, the method 200 includes determining one or more traffic flow characteristics from the obtained data. In various examples, step/operation 230 is performed continuously, periodically, and/or in response to a received request (e.g., from an onboard vehicle navigation system or a cloud-based processing system). In some implementations, the method 200 includes determining one or more traffic flow characteristics based, at least in part, on real-time data from the vehicle, real-time data from one or more other vehicles, and/or at least a portion of the data retrieved from the database(s). In some embodiments, the one or more traffic flow characteristics include at least one of speed limit fluctuation or an above-threshold frequency of braking events associated with a plurality of vehicles in the geographic location. In some implementations, the method 200 includes determining the one or more traffic flow characteristics using a machine learning model, such as a neural network model.

At step/operation 240, the method 200 includes determining one or more target driving parameters or one or more other predictive outputs. In some implementations, the method 200 includes determining an appropriate corrective operation using a machine learning model, such as a trained neural network model. The neural network model can be trained based, at least in part, on historical vehicle data, traffic data, accident data, road infrastructure data, or combinations thereof.

Optionally, at step/operation 250, the method 200 includes modifying one or more current driving parameters (e.g., driving speed) of the at least one vehicle based at least on the one or more target driving parameters (e.g., determined safe speed limit). In some implementations, step/operation 250 includes automatically modifying a vehicle's speed and/or route, modifying the vehicle's driving mode (e.g., deactivate an autonomous driving mode), or triggering other types of corrective operations.

At step/operation 260, the method 200 includes dynamically outputting at least one of the determined target driving parameters. For example, the system can dynamically and continuously determine target driving parameters and dynamically display at least some of the determined target driving parameters via one or more dynamic signs (e.g., digital displays).

In some examples, step/operation 260 includes transmitting an indication of at least one of the determined target driving parameters (e.g., safe speed limit) to another apparatus (e.g., another vehicle) that is within a predetermined range of the at least one vehicle or to a central server. Additionally, in some implementations, step/operation 260 includes generating a corresponding recommendation or alert. Such data can be used to inform transportation applications (public transportation systems), navigation systems, and the like. In some implementations, each of a plurality of vehicles in a cooperative driving system is configured to generate and transmit indications of one or more target driving parameters (i.e., share data) to other vehicles when they are within a predetermined range. The collected information and the output of the machine learning modules/techniques can form a large analytical dataset for roads and highways that can provide or show an approximation of the speed limit on each division of a plurality of roads/highways based on the hours of the day, days, weather condition, etc.

System outputs can also be utilized to inform other third-party systems such as police/security systems, road construction companies, insurance companies, Departments of Transportation (DOTs), and the like. By way of example, DOTs and the FDOT can employ the system for safety and to improve road safety and signage. As another example, vehicle manufacturers can utilize the system to improve vehicle safety and performance. In some implementations, insurance companies can use data obtained from the system to evaluate safe driving behavior and, in some examples, to set premium estimations. Logistics and transportation companies can employ the system to accurately monitor and estimate delivery times and improve safety.

Figure 3:
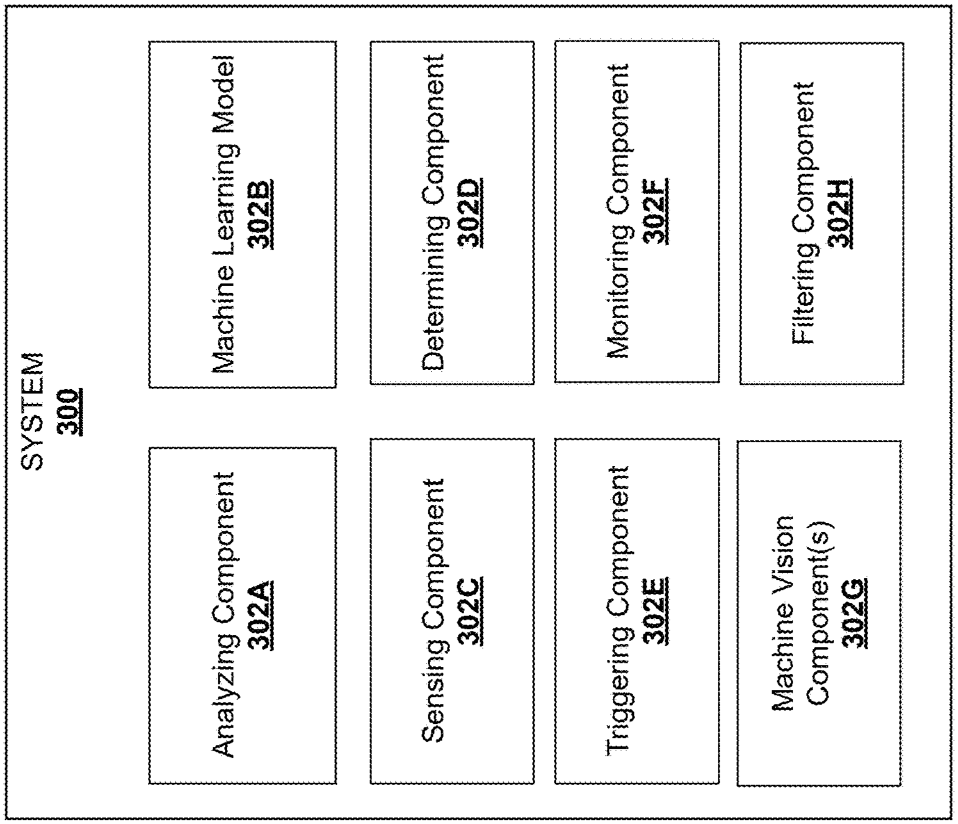
FIG. 3 is an example system in accordance with certain embodiments of the present disclosure.

Referring now to FIG. 3, an example system 300 is shown. In various implementations, the system 300 is embodied as a vehicle, computing device, or remote server. For example, the system 300 may be located remotely from a vehicle, while in other embodiments, the system 300 and the vehicle may be collocated, such as within the vehicle. Each of the components of the system, may be in communication with one another over the same or different wireless or wired networks including, for example, a wired or wireless Personal Area Network (PAN), Local Area Network (LAN), Metropolitan Area Network (MAN), Wide Area Network (WAN), cellular network, and/or the like. In some embodiments, a network may comprise the automotive cloud, digital transportation infrastructure (DTI), radio data system (RDS)/high-definition radio (HD) or other digital radio system, and/or the like. For example, a vehicle may be in communication with the system 300 via the network and/or via the Cloud. In the example shown in FIG. 3, the system 300 includes analyzing component(s) 302A, machine learning model(s) 302B, sensing component(s) 302C, determining component(s) 302D, triggering component(s) 302E, monitoring component(s) 302F, machine vision component(s) 302G, and filtering component(s) 302H.

Example Sensing Device

As detailed herein, an example vehicle can include one or more sensing devices that in turn comprise camera(s), sensor(s), and the like.

Advanced cameras and sensors: Autonomous vehicles are increasingly being equipped with high-resolution cameras and sensors. These cameras and sensors use a variety of techniques, such as high dynamic range (HDR) imaging and adaptive exposure control.

Infrared cameras: Infrared cameras can detect heat radiation. This technology has the potential to significantly improve the performance of autonomous vehicles in various conditions.

LiDAR: LIDAR is a laser-based technology that can create a 3D map of the surrounding environment. This map can be used to identify objects and road markings.

RADAR: RADAR is a radio-based technology that can detect objects by measuring the reflection of radio waves. RADAR can be used to identify objects and road markings.

Machine Learning

In some embodiments, the exemplary system can be implemented using one or more artificial intelligence and machine learning operations. The term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, transformer-based models (e.g., Bidirectional Encoder Representations from Transformers (BERT), Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by down-sampling). A fully-connected layer includes neurons, where each neuron is connected to all of the neurons in the previous layer. The layers are stacked similar to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., error such as L1 or L2 loss), during training. This disclosure contemplates that any algorithm that finds the minimum of the cost function can be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

Computing Devices and Methods of Use

It should be appreciated that the logical operations described herein with respect to the various figures may be implemented (1) as a sequence of computer-implemented acts or program modules (i.e., software) running on a computing device (e.g., the computing device described in FIG. 4), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special-purpose digital logic, and any combination thereof. It should also be appreciated that more or fewer operations may be performed than shown in the figures and described herein. These operations may also be performed in a different order than those described herein.

Figure 4:
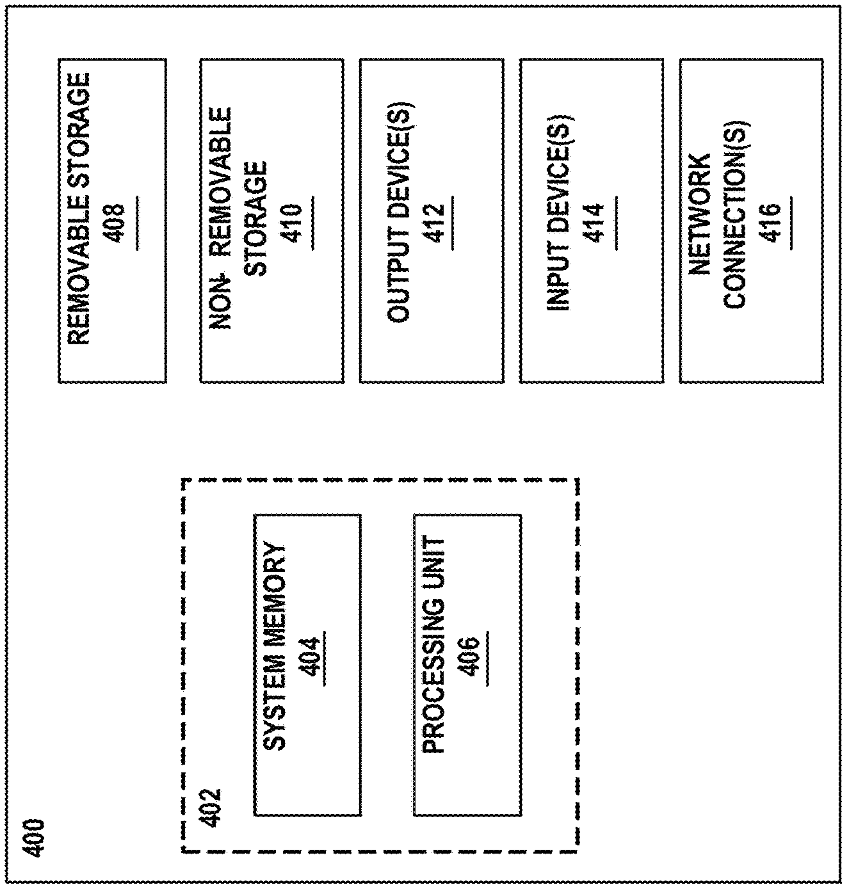
FIG. 4 is an example computing device.

Referring to FIG. 4, an example computing device 400 upon which embodiments of the present disclosure may be implemented is illustrated. It should be understood that the example computing device 400 is only one example of a suitable computing environment upon which embodiments of the present disclosure may be implemented. Optionally, the computing device 400 can be a well-known computing system including, but not limited to, personal computers, servers, handheld or laptop devices, multiprocessor systems, microprocessor-based systems, personal network computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, the computing device 400 typically includes at least one processing unit 406 and system memory 404. Depending on the exact configuration and type of computing device, system memory 404 may be volatile (such as random-access memory (RAM)), non-volatile (such as read-only memory (ROM), flash memory, etc.), or some combination of the two. This most basic configuration is illustrated in FIG. 4 by the dashed line 402. The processing unit 406 may be a standard programmable processor that performs arithmetic and logic operations necessary for the operation of the computing device 400. The computing device 400 may also include a bus or other communication mechanism for communicating information among various components of the computing device 400.

Computing device 400 may have additional features/functionality. For example, the computing device 400 may include additional storage such as removable storage 408 and non-removable storage 410 including, but not limited to magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412, such as a display, speakers, printer, etc., may also be included. The additional devices may be connected to the bus in order to facilitate communication of data among the components of the computing device 400. All these devices are well-known in the art and need not be discussed at length here.

The processing unit 406 may be configured to execute program code encoded in tangible, computer-readable media. Tangible, computer-readable media refers to any media that is capable of providing data that causes the computing device 400 (i.e., a machine) to operate in a particular fashion. Various computer-readable media may be utilized to provide instructions to the processing unit 406 for execution. Example of tangible, computer-readable media may include but is not limited to, volatile media, non-volatile media, removable media and non-removable media implemented in any method or technology for storage of information such as computer-readable instructions, data structures, program modules or other data. System memory 404, removable storage 408, and non-removable storage 410 are all examples of tangible computer storage media. Examples of tangible, computer-readable recording media include but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

It should be understood that the various techniques described herein may be implemented in connection with hardware or software or, where appropriate, with a combination thereof. Thus, the methods and apparatuses of the presently disclosed subject matter, or certain embodiments or portions thereof, may take the form of program code (i.e., instructions) embodied in tangible media or removable storage media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, for example, through the use of an application programming interface (API), reusable controls, or the like. Such programs may be implemented in a high-level procedural or object-oriented programming language to communicate with a computer system. However, the program(s) can be implemented in assembly or machine language if desired. In any case, the language may be a compiled or interpreted language, and it may be combined with hardware implementations.

In one embodiment, disclosed herein is a non-transitory computer-readable storage medium comprising instructions that, when executed, cause at least one processor to perform the method of any preceding embodiments.

Although certain implementations may refer to utilizing aspects of the presently disclosed subject matter in the context of one or more stand-alone computer systems, the subject matter is not so limited but rather may be implemented in connection with any computing environment. For example, the components described herein can be hardware and/or software components in a single or distributed systems, or in a virtual equivalent, such as, a cloud computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

What is claimed is:

1. A driving system comprising:

at least one vehicle, the at least one vehicle comprising:

at least one processor; and a memory having instructions thereon, wherein the instructions when executed by the at least one processor, cause the at least one processor to:

obtain data corresponding with a geographic location of the at least one vehicle, wherein the data is associated with a plurality of vehicles in the geographic location;

identify at least one of the plurality of vehicles as being an aggressive driver or vehicle, wherein the aggressive driver or vehicle is identified based on at least one of vehicle speed, a distance from other vehicles, a frequency of braking events, or a frequency of lane changes;

filter a portion of the data associated with the aggressive driver or vehicle;

determine one or more traffic flow characteristics based at least on the filtered data;

determine one or more target driving parameters including at least a safe speed limit for the at least one vehicle based at least on the one or more traffic flow characteristics; and in response to determining that the at least one vehicle's current speed exceeds the safe speed limit, modify the at least one vehicle's current speed.

2. The driving system of claim 1, wherein the instructions when executed by the at least one processor cause the at least one processor to further:

modify one or more current driving parameters of the at least one vehicle based at least on the determined one or more target driving parameters.

3. The driving system of claim 1, wherein identifying the at least one of the plurality of vehicles as being an aggressive driver or vehicle comprises applying a machine learning model.

4. The driving system of claim 1, wherein the one or more traffic flow characteristics include at least one of speed limit fluctuations or an above-threshold frequency of braking events associated with the at least another vehicle in the geographic location.

5. The driving system of claim 1, wherein the instructions when executed by the at least one processor cause the at least one processor to further:

modify the at least one vehicle's route, generate an alert or recommendation, and/or modify a vehicle driving mode based on the determined one or more target driving parameters.

6. The driving system of any one of claim 1, wherein the one or more traffic flow characteristics are determined using a machine learning model.

7. The driving system of claim 6, wherein the machine learning model is a neural network model.

8. The driving system of claim 1, the instructions when executed by the at least one processor cause the at least one processor to further:

dynamically output an indication of at least one of the determined target driving parameters to a dynamic driving sign.

9. The driving system of claim 1, wherein the instructions when executed by the at least one processor cause the at least one processor to further:

transmit an indication of at least one of the determined target driving parameters to another apparatus that is within a predetermined range of the at least one vehicle or to a central server.

10. The driving system of claim 1, wherein the obtained data includes real-time vehicle data obtained from the at least another vehicle.

11. The driving system of claim 10, wherein the real-time vehicle data comprises at least one of a vehicle speed, temperature, direction of travel, and vehicle path deviation/variance.

12. The driving system of claim 11, wherein the data includes current weather conditions, time of year, historical accident data corresponding with the geographic location, real-time or historical vehicle data from the vehicle or one or more other vehicles, and/or road infrastructure data.

13. The driving system of claim 1, wherein the data is at least partially obtained from one or more public databases.

14. The driving system of claim 1, wherein the one or more traffic flow characteristics or one or more driving parameters is used to update one or more existing maps and/or navigation systems.

15. The driving system of any one of claim 1, wherein the at least one vehicle is an autonomous or semi-autonomous vehicle.

16. A cooperative driving system comprising:

a plurality of vehicles in electronic communication with one another, each vehicle comprising:

a processor; and a memory having instructions thereon, wherein the instructions when executed by the processor, cause the processor to:

obtain data corresponding with a geographic location of the plurality of vehicles;

identify aggressive drivers or vehicles based on at least one of vehicle speed, a distance from other vehicles, a frequency of braking events, or a frequency of lane changes;

filter a portion of the data associated with the aggressive drivers or vehicles;

determine one or more traffic flow characteristics based at least on the filtered data;

determine one or more target driving parameters including at least a safe speed limit for the vehicle based at least on the one or more traffic flow characteristics, in response to determining that the vehicle's current speed exceeds the safe speed limit, modify the vehicle's current speed, wherein each of the plurality of vehicles is configured to transmit an indication of the determined one or more target driving parameters to at least another vehicle or a central server.

17. The cooperative driving system of claim 16, wherein each of the plurality of vehicles is configured to transmit the indication of at least one of the determined one or more target driving parameters to the at least another vehicle when it is within a predetermined range.

18. The cooperative driving system of claim 17, wherein each of the plurality of vehicles is an autonomous or semi-autonomous vehicle.

* * * * *